United States Patent [19]

Booth, Jr. et al.

[11] 3,945,693

[45] Mar. 23, 1976

[54] TRACK ROLLER

[75] Inventors: Sterling R. Booth, Jr., Yates City; Kenneth A. Rhoads, East Peoria, both of Ill.

[73] Assignee: Caterpillar Tractor Co., Peoria, Ill.

[22] Filed: Apr. 25, 1975

[21] Appl. No.: 571,900

[52] U.S. Cl. .................... 308/20; 308/36.1; 305/14
[51] Int. Cl.² ......................................... F16C 13/02
[58] Field of Search ............ 308/20, 36.1, 18, 109; 305/14, 27, 28

[56] References Cited
UNITED STATES PATENTS

| | | |
|---|---|---|
| 3,744,860 | 7/1973 | Casey .................................. 308/109 |
| 3,773,393 | 11/1973 | Story et al. ........................ 308/18 X |
| 3,866,985 | 2/1975 | Whitehurst ........................... 308/20 |

*Primary Examiner*—M. H. Wood, Jr.
*Assistant Examiner*—Gene A. Church
*Attorney, Agent, or Firm*—O. G. Pence

[57] ABSTRACT

A track roller has a stepped diameter shaft with a pair of spaced shoulders and an outer track engaging rim with a pair of opposite end faces individually substantially alignable with the shoulders of the shaft. A rim clamping and positioning device is disposable in opposing sliding relation against the shoulders of the shaft for rotatably mounting the rim on the shaft and has a sleeve portion extending in full load bearing relation between the shoulders of the shaft. A pair of opposing clamping surfaces are each positionable in facing, tightly clamping relation against respective ones of the end faces of the rim for limiting relative axial movement between the rim and shaft.

12 Claims, 2 Drawing Figures

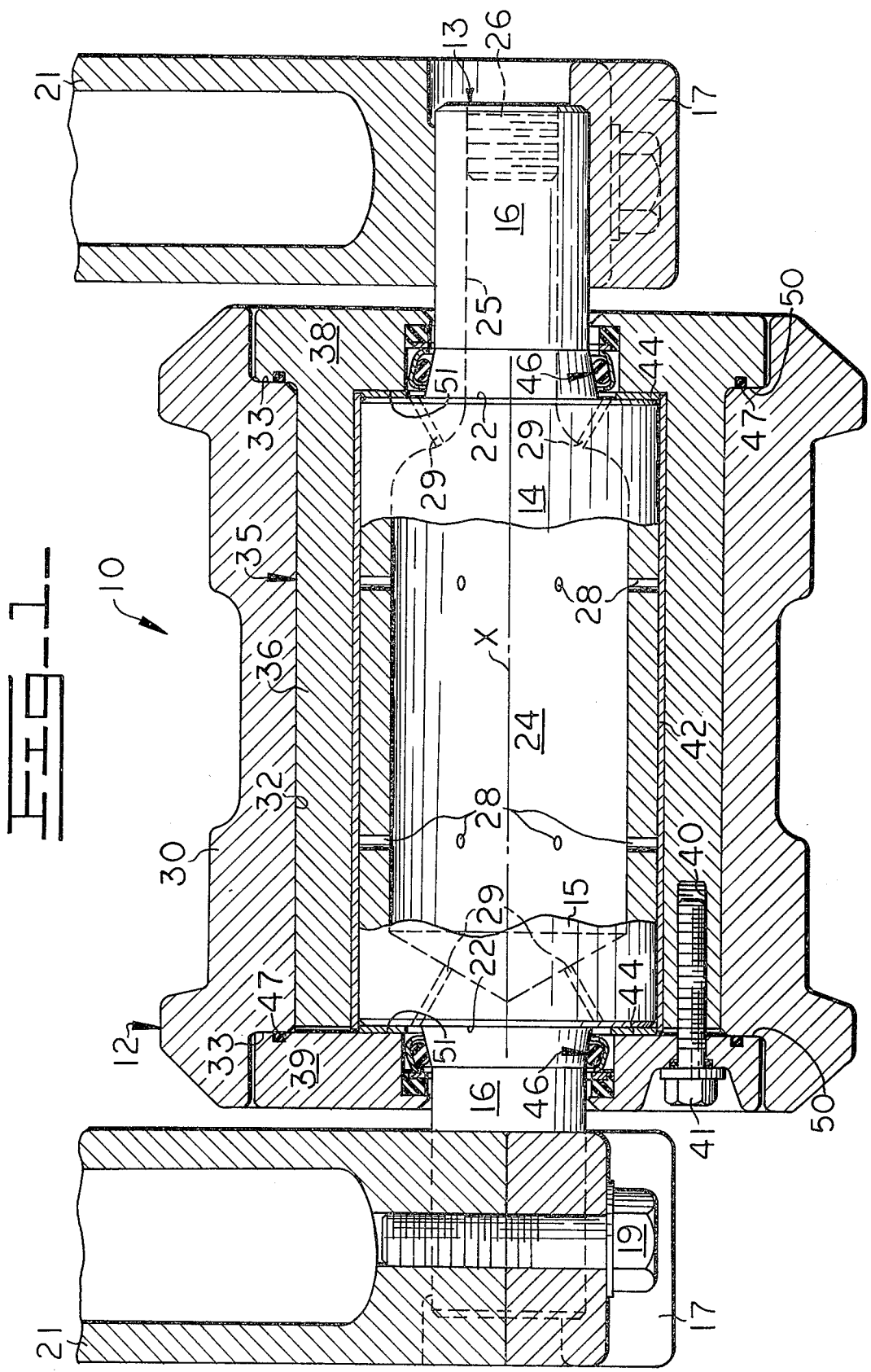

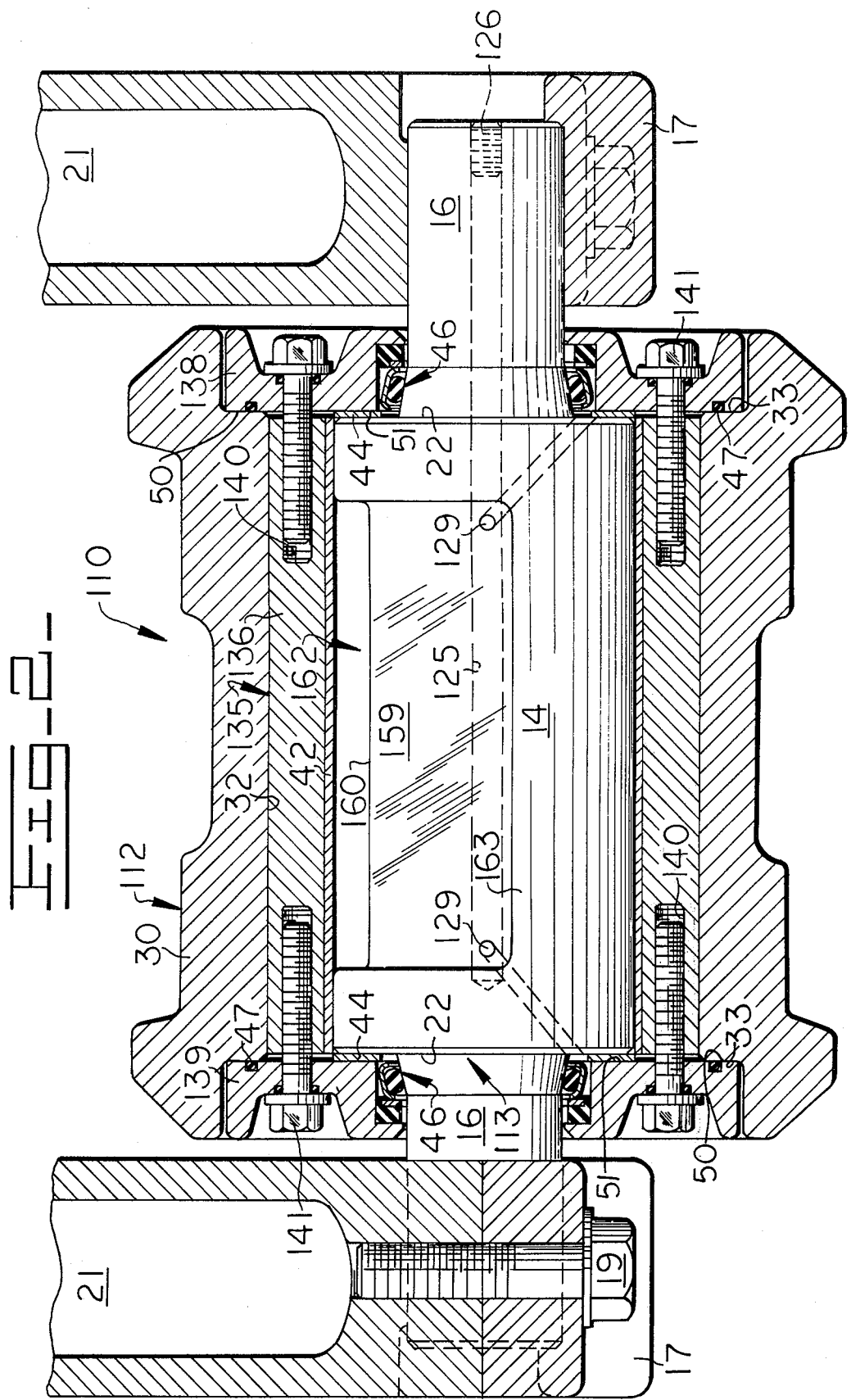

TRACK ROLLER

BACKGROUND OF THE INVENTION

A recent development in heavy duty track rollers for track-type vehicles is disclosed in U.S. Pat. No. 3,866,985 to Whitehurst and assigned to the assignee hereof. The track roller disclosed in such patent teaches the use of a pair of flanged, axially spaced retainer sleeves to facilitate the mounting of a thru-hardened track engaging rim about a stationary shaft of such track roller. The track roller of such patent is highly effective in alleviating the major deficiencies of prior known track rollers by reducing service costs and extending the wear life of the track roller components. However, recent increases in the weight of track-type vehicles has made it necessary to provide additional bearing surface area in order to support such additional weight.

OBJECTS OF THE INVENTION

Accordingly, an object of this invention is to provide an improved heavy duty track roller having the ability to support relatively heavy loads without any increase in the overall size or complexity of such track roller compared to conventional track rollers.

Another object of this invention is to provide the above track roller which, in addition, includes sufficient lubricating oil containing capacity to permit extended periods of operation without adding lubrication between routine service intervals.

Another object of this invention is to provide such track roller which is of relatively simple construction for ease of assembly and includes readily replaceable, economical to manufacture replacement components.

Other objects and advantages of the present invention will become more readily apparent upon reference to the accompanying drawings and following description.

BRIEF DESCRIPTION OF THE DRAWINGS

FIG. 1 is a longitudinal cross sectional view of a track roller embodying the principles of the present invention.

FIG. 2 is a cross sectional view similar to FIG. 1, but illustrating an alternate embodiment of the present invention.

DESCRIPTION OF THE PREFERRED EMBODIMENT

Referring more particularly to the drawings, an improved heavy duty track roller, embodying the principles of the present invention, is generally indicated at 10 in FIG. 1. The track roller includes an outer rim assembly 12 journalled for rotation about a stationary, stepped diameter shaft 13.

The shaft 13 is disposed along a longitudinal axis X and includes an elongated, enlarged diamter center portion 14 providing a substantially large radial load bearing surface area 15 thereabout. A pair of reduced diameter mounting end portions 16 extend coaxially from the opposite ends of the center portions of the shaft 13. The mounting ends are embraced by respective ones of a pair of end caps 17. The end caps are secured in any suitable manner, such as by bolts 19, to a pair of laterally spaced sidewalls 21 of a conventional track roller frame. A pair of spaced, radially disposed annular shoulders 22 are provided at the opposite ends of the center portion of the shaft for purposes hereinafter described.

The shaft 13 is preferably hollow with an enlarged internal cavity 24 formed within its center portion 14. A fill passage 25 is provided through one of the end portions 16 for admitting lubricating fluid into the cavity. The fill passage is normally closed by a plug 26. The shaft herein described is preferably formed by the method disclosed in U.S. application Ser. No. 421,120 to Gibble et al, filed Dec. 3, 1973, and assigned to the assignee hereof. A plurality of radial passages 28 are provided for communicating fluid from the cavity to the radial load bearing surface area 15. A plurality of angularly disposed passages 29 are also provided for communicating lubricating fluid to the shoulders 22.

The rim assembly 12 includes a generally cylindrical track engaging rim 30 having a longitudinal centrally disposed bore 32 therethrough. The rim also has a pair of oppposte, radially extending end faces 33 disposed at the opposite ends of the bore. The rim is preferably constructed of steel material which is thru-hardened by heat treatment to provide better wear characteristics during severe operating conditions. As a result, the rim is not readily machinable after heat treatment which negates the machining of threaded apertures and the like therein. Those skilled in the art will appreciate that the forming of threaded apertures into a part, such as a rim, before heat treating is also not desirable because of the tendency of cracks to form about such apertures, which cracks promulgate during operation and cause the premature failure of the rim.

The rim assembly also includes a rim clamping and positioning device 35 including a sleeve portion 36. The sleeve portion is constructed of relatively softer machinable metal material and preferably sized to be slidably received within the bore 32 of the rim 30 for purposes hereinafter more fully described.

The rim clamping and positioning device also includes a pair of flange members 38 and 39. Each flange member has a clamping surface 50 thereon facing a respective one of the end faces 33 of the rim and a thrust surface 51 facing a respective one of the shoulders 22 of the shaft.

In the embodiment shown in FIG. 1, one of the flange members, 38, is formed integrally on one end of the sleeve portion 36, whereas the other flange member 39 is separate therefrom. A plurality of angularly spaced threaded apertures, one of which is shown at 40, are formed in the other end of the sleeve portion 36. The second flange member 39 is secured to the other end of the sleeve portion 36 by a like plurality of bolts 41 which are disposed through flange member and screw threadably secured with the threaded apertures 40.

A sleeve bearing 42, which may be constructed of any suitable bearing material, such as bronze, aluminum and the like, is preferably mounted within the sleeve member 36 to facilitate free rotation of the rim assembly 12 about the shaft 13. The bearing is preferably coextensive along the entire length of the center portion 14 of the shaft so as to obtain the maximum benefit of load bearing surface area 15 provided thereon. The sleeve member 36 also serves as a rigid backing for the sleeve bearing 42 to permit the bearing to be relatively thin which advantageously reduces both its initial and replacement costs.

A pair of annular thrust bearings 44 are preferably individually provided on the thrust surfaces 51 of the flange members to permit freer rotational sliding movement between the flange members and the shoulders of the shaft while effectively constraining the axial movement of the rim assembly relative to the shaft and transmitting any axial thrust loads therebetween.

To prevent the loss of the lubricating fluid from the track roller, seal members such as a pair of rotary seals 46 and a pair of static seals 47 are provided. The rotary seals 46 are individually disposed between the flange members 38 and 39 and their respective end portions 16 of the shaft. The static seals 47 are disposed between the flange members and their respective end faces 33 of the rim.

As is readily visible in FIG. 1, the sleeve portion 36 is provided with a predetermined longitudinal length measured from flange member 38 to its other end so as to be slightly shorter than the length of the bore 32 of the rim. This provides a gap between the other end of the sleeve and the flange 39 to insure that when the bolts 41 are tightened, the clamping surfaces 50 of the flange members are brought into tightly clamping relation against their respective end faces 33 of the rim 30. Thus, the rim assembly 12 is effectively secured about the shaft without any machining being required to the rim 30, per se, for securement purposes after it is heat treated.

ALTERNATE EMBODIMENT

An alternate embodiment of the present invention is illustrated in FIG. 2 and includes a track roller 110 having a rim assembly 112 and a stationary shaft 113 which differ in certain respects from their corresponding components illustrated in FIG. 1. In FIG. 2, components which are identical to those previously described for the FIG. 1 embodiment are depicted by like numerals, even though they may not be specifically mentioned in the following detailed description, which will be directed primarily to the differences between the structure of FIG. 2 and that of FIG. 1.

In FIG. 2, the rim assembly 112 includes a rim clamping and positioning device 135 which includes a cylindrical sleeve portion 136 and a pair of indentical flanges 138 and 139, both of which are separate from the sleeve portion 136. Each end of the sleeve portion is provided with a set of angularly spaced threaded apertures 140 and each flange member is individually secured to its corresponding end by bolts 141. As is readily visible in FIG. 2, the sleeve portion 136 is also provided with a predetermined length which is slightly less than that of the bore 32 of the rim 30. This provides a slight gap between its ends and the flanges 138 and 139 to insure that the rim 30 is effectively clamped when the bolts 141 are tightened.

The shaft 113, instead of being hollow, is provided with recessed surface portions, two of which are shown at 159 and 160, which are formed on the upper half of the center portion 14 of the shaft so as to form a chamber 162 for lubricating oil. A bearing surface 163 preferably extends approximately 180° on the underside of the center portion of the shaft to afford a large and uninterrupted bearing surface area for track rolling purposes. A centrally disposed fill passage 125 is provided in the shaft which passage is normally closed by a plug 126. A plurality of angularly disposed passages 129 communicate the chamber 162 and the fill passage with the shoulders 22 of the shaft for communicating fluid to the thrust bearings 44 and the rotary seals 46.

The particular shaft depicted in FIG. 2 is preferably constructed in accordance with the teachings of U.S. Pat. No. 3,515,446 to McGuire, and also assigned to the assignee hereof.

Thus, it is apparent from the foregoing that the objects of the present invention are fully satisfied by construction of the present track roller which enables the use of a rim 30 which needs no machining after heat treating, such as for tapped holes for securement purposes, thus permitting the rim to be thru-hardened for increased wearability and reduced bellmouthing. The simple construction of rim also reduces its manufacturing costs, thus making it a more economical replacement item.

Also, by utilizing the entire length of the center portion of the shaft to provide a greater amount of radial load bearing surface area, both embodiments of the present track roller are capable of supporting heavier loads than conventional track rollers of similar size. While accomplished through different shaft constructions, both track roller embodiments also provide sufficient lubricating oil capacity to permit extended periods of operation without maintenance.

It should be noted that either the shaft or particular sleeve and flange constructions shown in the FIG. 2 embodiment may be independently interchanged with those shown in the FIG. 1 embodiment and vice versa.

As mentioned earlier, the sleeves 35 and 135 are preferably slidably received within the bore 32 of the rim, which makes replacement of the rim in the field possible because no special equipment, such as a press, is needed to separate and reassemble the rim and sleeve. Also, the fact that the sleeve is not compressed, as when press fitted into a rim, alleviates the expansion of the sleeve with the rim due to the effects of bellmouthing of the rim during subsequent operation. Thus, the size of the sleeve remains substantially constant during service, which helps extend the life of the sleeve bearing 42 by maintaining the proper fit between the bearing and the shaft.

While the invention has been described and shown with particular reference to the preferred embodiments, it will be apparent that variations might be possible that would fall within the scope of the present invention which is not intended to be limited except as defined in the following claims.

What is claimed is:
1. A track roller comprising:
a stepped diameter shaft having a pair of spaced shoulders;
an outer track engaging rim rotatably mounted on said shaft and having a pair of opposite end faces individually substantially alignable with said shoulders on the shaft; and
rim clamping and positioning means disposable in opposing sliding relation against said shoulders of the shaft and having a sleeve portion extending in full load bearing relation between said shoulders and a pair of opposing clamping surfaces each positionable in facing, tightly clamping relation against respective ones of said pair of end faces of the rim for limiting relative axial movement between said rim and the shaft.

2. The track roller of claim 1 wherein one of said clamping surfaces is formed integral on said sleeve portion of the rim clamping and positioning means and the other of said clamping surfaces is separate therefrom and said rim clamping and positioning means includes fastening means to secure said other clamping surface to said sleeve portion.

3. The track roller of claim 1 wherein both of said clamping surfaces are separable from said sleeve portion and said rim clamping and positioning means includes fastening means for individually securing each of said clamping surfaces to said sleeve portion.

4. A track roller comprising:
a stepped diameter shaft defining an elongated, enlarged diameter center portion and a pair of spaced shoulders disposed at the opposite ends of said center portion;
an outer generally cylindrical track engaging rim having a pair of opposite end faces individually substantially alignable with said shoulders on the shaft; and
rim clamping and positioning means for rotatably retaining said rim on said shaft and including;
a sleeve portion having a length substantially equal to and in full radial supporting relation along the center portion of the shaft between said shoulders thereof; and
flange means provding a pair of opposing thrust surfaces and a like pair of opposing clamping surfaces with the thrust surfaces being positionable in opposing sliding relation against respective ones of said shoulders of the shaft and the clamping surfaces being positionable in facing, tightly clamping relation against respective ones of said end faces of the rim so as to limit axial movement of the rim relative to the shaft and to mount said rim and shaft in unitary assembly.

5. The track roller of claim 4 including:
relatively thin cylindrical sleeve bearing means mounted within said sleeve portion and extending substantially along said center portion of the shaft;
a pair of annular thrust bearing individually disposed between the thrust surfaces of said flange means and respective ones of said shoulders of the shaft for transmitting axial thrust loads between said rim and said shaft; and
means for lubricating said sleeve bearing means and said thrust bearings during extended periods of operation.

6. The track roller of claim 5 wherein said shaft includes a pair of reduced diameter end portions extending coaxially from the opposite ends of the center portion thereof; and
a pair of support brackets embracing respective ones of said end portions for mounting said track roller to a supporting frame.

7. The track roller of claim 6 wherein said lubricating means includes:
a pair of rotary seals disposed between said flange means and respective ones of said end portions of the shaft; and
a pair of static seals disposed between said flange means and respective ones of said end faces of said rim.

8. The track roller of claim 7 wherein said sleeve bearing means is a single continuous sleeve bearing extending the entire length of the center portion of said shaft between said shoulders.

9. The track roller of claim 8 wherein said sleeve portion has opposite ends and said flange means includes a pair of annular flange members with one of said flange members being formed integrally on one end of said sleeve portion and the other of said flange members being separable from said sleeve portion and disposed in slightly spaced relation from the other end of the sleeve portion; and said rim clamping and positioning means includes fastening means for securing said other flange member to said other end of the sleeve portion.

10. The track roller of claim 9 wherein the center portion of the shaft includes a continuous cylindrical bearing surface thereabout between said shoulders defining a relatively large radial load bearing surface area in mating slidable engagement with said sleeve bearing; and
said lubricating means includes an enlarged cavity formed within said center portion of the shaft for retaining lubricating oil therein, and passage means for communicating said cavity with said bearing surface, said thrust bearings and said rotary seals.

11. The track roller of claim 8 wherein said sleeve portion has opposite ends and said flange means includes a pair of annular flange members, both of which are separate from said sleeve portion and disposed in slightly spaced relation from respective ones of the opposite ends of said sleeve portion; and wherein said rim clamping and positioning means includes fastening means for individually securing each of said flange members to their respective ends of said sleeve portion and to bring said clamping surfaces of the flange members into clamped engagement with the opposite end faces of the rim.

12. The track roller of claim 11 wherein said lubricating means includes recessed surface portions formed in the upper half of the center portion of the shaft so as to define a substantially large chamber for retaining lubricating oil therein and passage means for communicating said chamber with said thrust bearings and said rotary seals.

* * * * *